(12) United States Patent  
Chen et al.

(10) Patent No.: US 10,277,454 B2  
(45) Date of Patent: Apr. 30, 2019

(54) HANDLING FAILURE OF STACKING SYSTEM

(71) Applicant: HANGZHOU H3C TECHNOLOGIES CO., LTD., Zhejiang (CN)

(72) Inventors: Shixing Chen, Beijing (CN); Xiaodong Zhou, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/526,399

(22) PCT Filed: Nov. 11, 2015

(86) PCT No.: PCT/CN2015/094330  
§ 371 (c)(1),  
(2) Date: May 12, 2017

(87) PCT Pub. No.: WO2016/074622  
PCT Pub. Date: May 19, 2016

(65) Prior Publication Data  
US 2017/0331676 A1     Nov. 16, 2017

(30) Foreign Application Priority Data

Nov. 12, 2014 (CN) ............................ 2014 1 0637355

(51) Int. Cl.  
*H04L 12/24* (2006.01)  
*H04L 12/775* (2013.01)

(52) U.S. Cl.  
CPC ...... *H04L 41/0654* (2013.01); *H04L 41/0663* (2013.01); *H04L 45/58* (2013.01)

(58) Field of Classification Search  
CPC ............ H04L 41/0654; H04L 41/0659; H04L 41/0663; H04L 41/0668; H04L 41/0672;  
(Continued)

(56) References Cited

U.S. PATENT DOCUMENTS 6,111,881 A * 8/2000 Soncodi ................. H04L 45/04  
370/218  
6,832,331 B1 * 12/2004 Manning ................ G06F 11/20  
714/11

(Continued)

FOREIGN PATENT DOCUMENTS

CN        101145895        3/2008  
CN        101442484 A      5/2009

(Continued)

OTHER PUBLICATIONS

International Searching Authority, "Notifcation of Transmittal of the International Search report and the Written Opinion", PCT/CN2015/094330, dated Jan. 27, 2016, 11 pages.

(Continued)

*Primary Examiner* — Sharad Rampuria  
(74) *Attorney, Agent, or Firm* — Hewlett Packard Enterprise Patent Department

(57) ABSTRACT

This application provides a method for deciding on handling a failure of a stacking system, where the method includes: collecting values of a decision parameter for respective groups after the stacking system is divided; and applying a preset reserve strategy according to the values of the decision parameter for the respective groups to decide on one of the groups to be reserved.

14 Claims, 5 Drawing Sheets

(58) Field of Classification Search
CPC ......... H04L 45/22; H04L 45/28; H04B 10/03; H04B 10/032; H04B 10/035; H04B 10/038; H04J 14/0287; H04J 14/0289; H04J 14/029; H04J 14/0291; H04J 14/0293; H04J 14/0294; H04J 14/0295; H04J 14/0297; H04J 2203/006
See application file for complete search history.

(56) References Cited

U.S. PATENT DOCUMENTS

| | | | |
|---|---|---|---|
| 9,391,844 B2* | 7/2016 | Kashyap | ................. H04L 41/12 |
| 9,609,590 B2* | 3/2017 | Chandrasekaran | .......................... H04W 52/0209 |

FOREIGN PATENT DOCUMENTS

| | | |
|---|---|---|
| CN | 101917287 A | 12/2010 |
| CN | 102457402 | 5/2012 |
| CN | 103200134 A | 7/2013 |
| CN | 104104596 A | 10/2014 |

OTHER PUBLICATIONS

International Preliminary Report on Patentability received for PCT Patent Application No. PCT/CN2015/094330, dated May 26, 2017, 6 pages.

* cited by examiner

HANDLING FAILURE OF STACKING SYSTEM

BACKGROUND

Network devices can be virtualized to simplify the network structure and to lower the management complexity. For example a plurality of network devices, such as switches, may be connected together and virtualized as a single network device. Such technology is may be referred to as a stacking system. A stacking system may be managed as if it were a single device and acts as a single device, from the perspective of external devices. The stacking system thus includes a plurality of physical member devices, and may act as if it was a single physical device including the ports of all of its member devices. Hardware resources and software processing capacities of the network devices can be integrated in this virtualization technology so that the network devices can interoperate with each other, and be managed collectively.

The Intelligent Resilient Framework (IRF) proposed by the H3C Corp., is one example of a stacking system in which at least two network devices (e.g., Ethernet switches) are connected together through virtualization in software and configured as necessary and then virtualized into a "distributed device".

DETAILED DESCRIPTION

Figure 1:
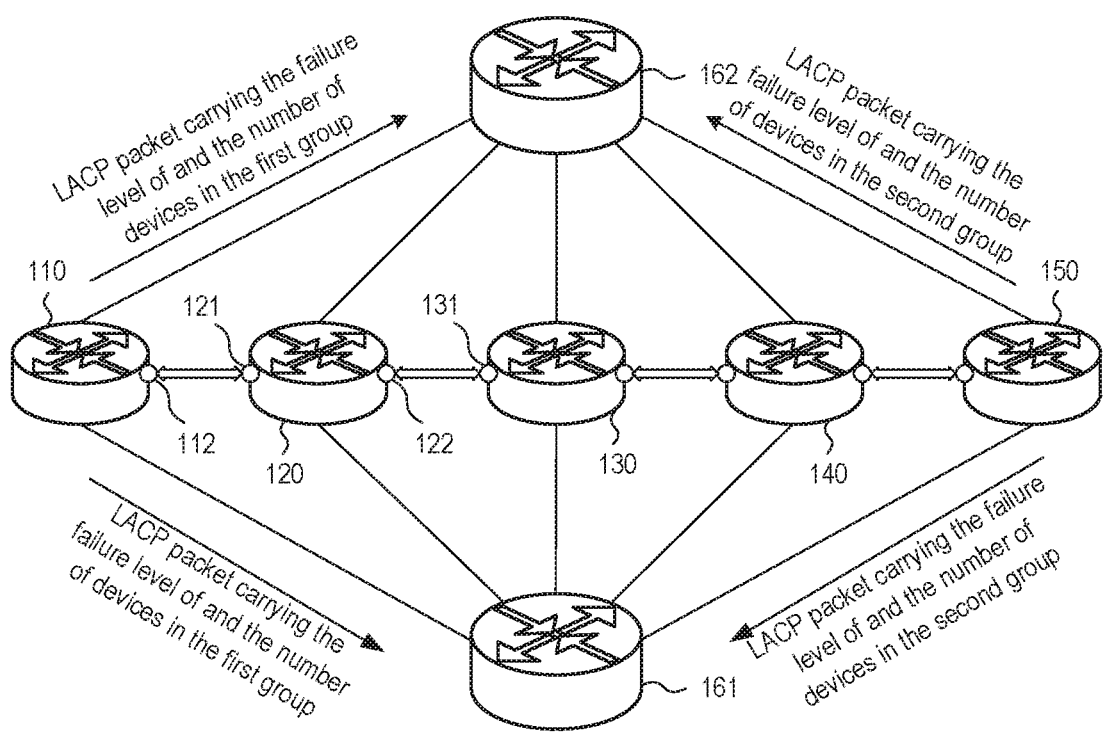
FIG. 1 is a structural diagram of a network deployment of a stacking system in an example.

A stacking system can facilitate simplified management in that after the stacking system is deployed, an administrator can log on the stacking system via any port of any member device to manage all the member devices in the stacking system collectively. IRF is one example of a stacking system. The stacking system may be highly reliable, for example, as follows: the stacking system may include a number of member devices including a master device which is responsible for operation and management of the stacking system, and slave devices which can handle services, such as data packet forwarding, while acting as slave devices. Once the master device fails, the system will automatically elect a new master device rapidly so that the service will not be interrupted, which could achieve the 1:N backup of the master device. Moreover, stacking links between the member devices can be aggregated, and physical links between the stacking system and upper level and lower level devices connected to the stacking system may be aggregated. The aggregated links can both backup each other and achieve load balance to thereby further improve the reliability of the stacking system. Upper level devices means devices at a higher level of the network, for instance in a three layer access-aggregation-distribution network, if the stacking system is in the aggregation layer, then lower level devices may be in the access layer and upper level devices in the distribution layer. In other examples, the lower level devices may include client devices such as computers and a router may act as an upper level device connected to the stacking system.

There is good extensibility of the stacking system in that member devices can join to extend the number of ports and the bandwidth of the stacking system easily and freely; and since generally the respective devices are provided with processors and capable of processing protocol packets (also called "control packets") and forwarding data packets separately. In this way, the processing capacity of the stacking system can also be extended easily and freely.

In an example of the stacking system, the member devices are connected via stacking ports, and may notify each other of states of the member devices, numbers of the member devices, priorities of the member devices, connection relationships of the member devices, and other information by exchanging Hello packets via the stacking ports. Each member device records known topology information locally, sends the known topology information periodically via the stacking ports, and updates the locally recorded topology information upon reception of the topology information of the other member devices, so that all the member devices will collect the entire topology information.

After a member device fails or a connection link between two stacking ports fails, a member device connected directly with the failing point will detect the failure, and broadcast a failure occurrence packet to the other member devices in the stacking system. The member devices receiving the packet will update their locally stored topology information of the stacking system. After the topology information is updated, the unreachable member devices may be determined to have left the stacking system. If the master device leaves, then a new master device will be elected from the currently online slave devices to continue with the services of the original stacking system.

In some cases, a failure may cause the stacking system to be split, or divided, into two or more groups, wherein each group includes at least one member device and communication between two groups is not possible via the stacking ports. For instance, this may occur due to a failure of a stacking port, or a failure of a stacking link, or a failure of a member device. After division, each group of the plurality of groups may determine that the other group or groups have left the stacking system. After the stacking system has split, each group may become a separate stacking system, and reuse the same address and configuration as the original stacking system.

In the stacking system as illustrated in FIG. 1, for example, member devices 110, 120, 130, 140, and 150 are connected in a chained topology via their respective stacking ports, and connected with a network device 161 and a network device 162 respectively via their respective other ports, where the member device 150 is a master device of the stacking system. If a link connecting the stacking port 122 of the member device 120 and the stacking port 131 of the member device 130 is broken, then the member devices 110 and 120 will determine that the member devices 130, 140, and 150 have leaved, and elect a new master device which is the member device 110; and the member devices 130, 140, and 150 will also determine that the member devices 110 and 120 have leafed, and still take the member device 150 as the master device. Thus the member devices 110 and 120 are a group, and the member devices 130, 140, and 150 are another group, thus resulting in two stacking systems with the same layer 3 address and configuration. Similarly if the member device 130 fails and goes offline, then the stacking system will also be divided.

The Multi-Active Detection (MAD) technology can prevent two stacking systems with the same layer 3 address and configuration from occurring in the network. Particularly if there is a member device leaving from the stacking system, then the master device will generate a division detection packet carrying an active identifier (ID) of the (local) group to which the master device belongs. Typically each member device of the stacking system has a member number and the member number of the master device is taken as the active ID of the group to which master device belongs. The respective member devices in the stacking system are numbered differently from each other, so if the stacking system is divided into two groups, then the member numbers of their master devices will be different. The master device sends the generated division detection packet to the other member devices in the stacking system via another port (than the stacking port). If the master device receives a division detection packet from another member device, which carries a different active ID from the active ID of the local group, then it will be determined that the stacking system is divided.

The master devices of the two groups compare the active IDs of the local group to which they belong and the active ID of the other groups, maintain the group with the larger active ID, and disable the service ports (also called as "data ports") of the other groups. The service port means a port via which the data packet is forwarded in the stacking system, other than the stacking port. In another example, the group with the smaller active ID may be maintained and the service ports of the other group or groups disabled. Sometimes the term "reserving" a group may be used instead of "maintaining" a group, but the meaning is the same. Thus according to this method a group is maintained or disabled based on the active ID of its master device. Maintaining a group means that the group is keeps the layer 3 address and configuration of the original stacking system which has split into plurality of groups. Disabling a group means that the service ports of the group are temporarily disabled before the group is re-configured as a new stacking system separate to the other group or groups which have split off.

Thus by the above method, it may be ensured that two stacking systems with the same address and configuration will not be present in the network. It should be noted that in the special case of a member device leaving in a manner which does not split the stacking system (for example, if the member device 110 in FIG. 1 becomes offline), and at this time the master device will not receive any division detection packet with a different active ID and thus will not determine which one of the groups is reserved and handle the division of the stacking systems. Rather the division detection packets are triggered by failures which split the stacking system into a plurality of groups.

One limitation of the above described Multi-Active Detection method is that it determines which one of the groups is to be maintained based the active IDs of the groups of the devices. However, in some cases this approach may cause an important group to be disabled and a less important group to be maintained. Still taking the stacking system illustrated in FIG. 1 as an example, after the link connecting the stacking port 112 of the member device 110 and the stacking port 121 of the member device 120 is broken, the member device 110 which is a group becomes a master device of the group, and the member device number 10 thereof is the active ID of the group; and the member devices 120, 130, 140, and 150 are a group for which still the member device 150 is a master device, and the number 50 of the member device 150 is the active ID of the group. The two groups are actually two new stacking systems at this time. If the group with the smaller active ID is reserved as an active stacking system, then the group, including four devices, with a broader bandwidth and a high processing capacity will be disabled, a primary service process on the master device of the original stacking system, i.e., the member device 150, will also be disabled, and the member device 110 will recalculate route data to retrieve the data already on the original master device 150. In another example, if a board card where the stacking port of the member device 110 is located fails so that communication with the member device 120 fails, then the service of the stacking system will be migrated to the group with a narrower bandwidth and a lower processing capacity, which is a group where the failing point is located, where the failure of the group may be repaired by switching the service of the stacking system again, thus degrading the performance and stability of the network.

Accordingly the present application proposes a method and a stacking system in which the selection of which group is to be maintained after a stacking system is divided into a plurality of groups, is determined based on a reserve strategy.

Figure 2:
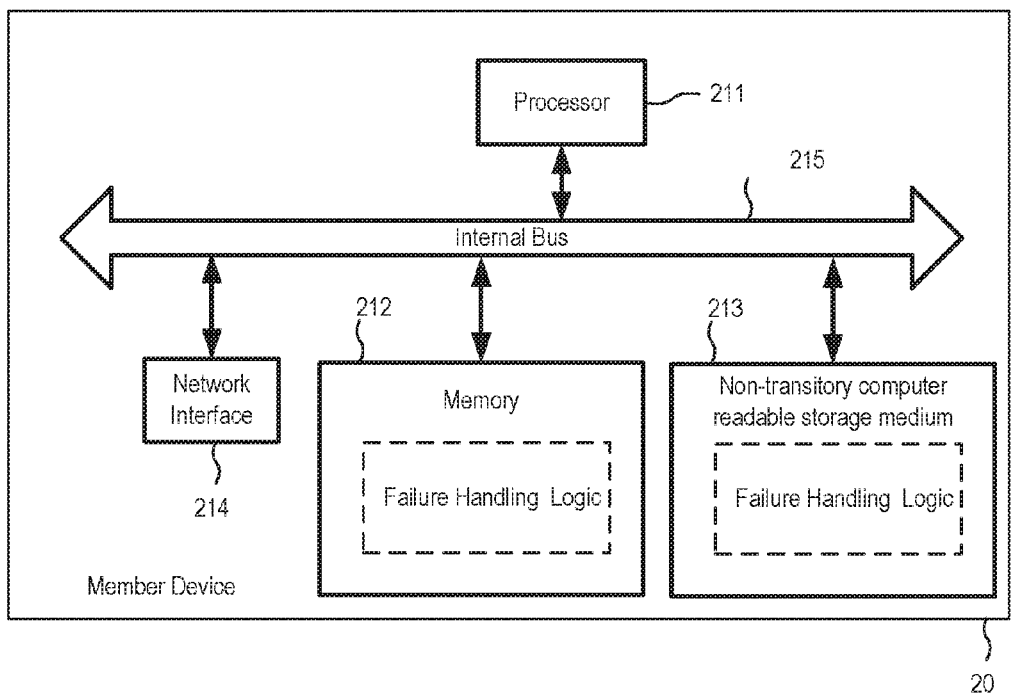
FIG. 2 is a schematic diagram of the hardware architecture of member devices in a stacking system in an example.
Figure 3:
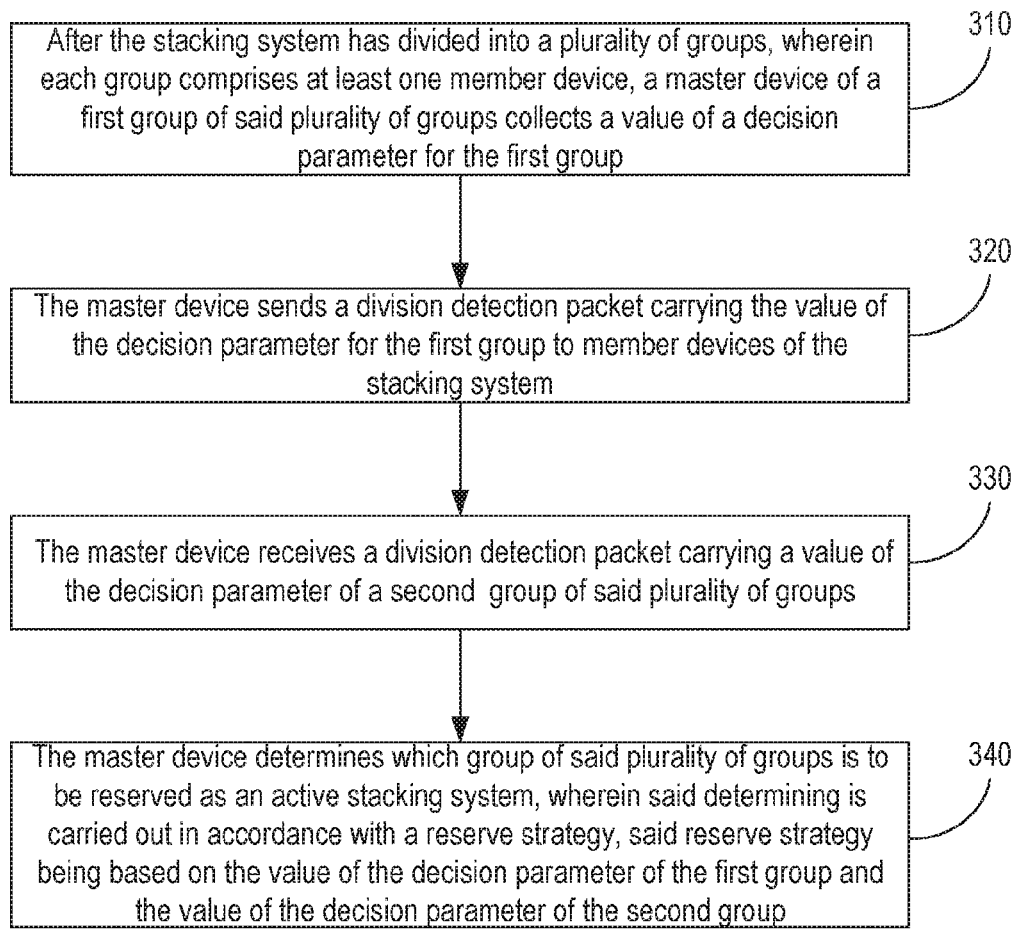
FIG. 3 is a flow chart of a method for handling a failure of a stacking system in an example.

In an example of this application, a failure handling logic running on the master device of the stacking system which has split into a plurality of groups, can decide on reserving one of the groups, according to a preconfigured reserve strategy. Referring to FIG. 2, the member device 20 of the stacking system may include a processor 211, a memory 212, a non-transitory computer readable storage medium 213 and a network interface 214, all of which may be connected with each other over an internal bus 215. Additionally the member device 20 may include a frame, a power source, a fan, a network forwarding chip, an Ethernet module or an optical module, and other components. Upon starting, a member device may load the failure handling logic into the memory 212, and if there is a member device leaving from the stacking system, then the processor 211 on the master device may operate the failure handling logic in the memory 212 in an operational flow as illustrated in FIG. 3.

In the block 310, after the stacking system has divided into a plurality of groups, wherein each group comprises at least one member device, a master device of a first group of said plurality of groups collects a value of a decision parameter for the first group.

In this example, a reserve strategy is preset on member devices of the stacking system so that one of the groups to be reserved when the stacking system is divided is determined in the reserve strategy based upon at least one decision parameter. If there is a member device leaving from the stacking system, then several member devices still reachable via stacking ports will be a group, and if the leaving member device is a slave device, then a master device in the group will be reserved; and if the leaving member device is the master device, then a new master device will be elected from the member devices in the group. For the decision parameters to be applied in the reserve strategy, the master device of its local group (the first group) retrieves current particular values of these decision parameters for the group. Dependent upon a different failing point, several leaving member devices may be another group (a second group), and a master in the second group will also be perform this block to collect the values of the decision parameters for the local group.

The reserve strategy can be set in a number of ways, for example, the reserve strategy of the stacking system may be set by an administrator; or a default reserve strategy can be provided so that the default reserve strategy will be applied if no reserve e strategy is set by the administrator; or several reserve strategies can be preset, and one of them can be applied automatically to the stacking system dependent upon configuration conditions of the service and member devices thereof. This example will not be limited to any particular setting manner.

Those decision parameters to be applied in the reserve strategy, and a judgment criterion to which these decision parameters will be applied to thereby determine the group to be reserved can be determined upon a network environment in which the stacking system is located, and a particular application scenario thereof. All of hardware configurations, software configurations, performance indexes, operating states, and other parameters of the groups, which can be obtained by the master device can be applied as the decision parameters, and include but will not be limited to hardware configurations, hardware health conditions, software configurations, software health conditions, the numbers of member devices, the amount and importance of traffic of the service, etc., and these parameters can be obtained by a health detection feature, a service traffic monitoring function, a system software monitoring function, etc., of the master device or the stacking system. Several examples of the reserve strategy will be described as follows:

In one example, a failure level is applied as a decision parameter, and the reserve strategy is that if there are different failure levels of the two groups, then the group at the lower failure level will be reserved. Various hardware and/or software failures which can be collected by the master device can correspond to different failure levels, and the master device can determine the value of the failure level of the first group for the detected failure. The master device can determine the occurring failure using the health check function and the failure detection function of the stacking system, the hardware and software monitoring functions of the member devices, etc., and set the corresponding failure level considering an influence of the failure upon the group, an influence upon the service when trying to recover the failure, and other factors. For example, if the first group fails in hardware or software, then the failure level will be set as a relatively higher level; otherwise, the failure level will be set as a relatively lower level.

In another example, whether a group includes the master device of the original stacking system before there is a member device leaving is a decision parameter, and the reserve strategy is that the group, where the master device of the original stacking system is located is reserved. Typically the primary service procedure of the stacking system runs, and all the route data are stored, on the master device, so the group where the original master device is located can be reserved to thereby avoid the route data from being recalculated so as to alleviate an influence upon the stability of the network.

In yet another example, the number of devices in a group is a decision parameter, and the reserve strategy is that the group including the largest number of devices is reserved. Typically the stacking system is provided with member devices with approximate bandwidths and processing capacities, so the comparison between the numbers of devices in the two groups can generally evaluate the comparison between the bandwidths and the processing capacities of the two groups approximately, and the group including the largest number of devices may be reserved so that the reserved new stacking system (the reserved group) can offer a broader bandwidth and a higher processing capacity.

In still another example, a priority of a member device in the stacking system is a decision parameter, and the reserve strategy is that the group where the member device at the highest priority in the stacking system is reserved. The priorities of the member devices can be specified by the administrator or can be generated automatically by the stacking system when them join the stacking system, and a member device at a higher priority may be a member device on which a more important service runs, a member device with a higher hardware or software configuration, etc., dependent upon a particular scenario.

In a further example, whether a group includes a member device with a preset device number (for instance, specified by an administrator) is a decision parameter, and the reserve strategy is that a group where the member device with the preset device number is located is reserved. For example, a member device forwarding important service data can be determined as the member device with the preset device number to thereby avoid as many as possible an influence upon the important service when the stacking system is divided.

Moreover the reserve strategy can be set with more than two decision parameters and a number of judgment criterions, where these decision parameters can be provided with the same or different priorities, and in the latter case, the decision parameters at the lower priority will be considered only if there are the same values of the decision parameter at the higher priority, collected by the two groups (a first and second groups). In an example, a failure level can be a decision parameter at the highest priority, and the other decision parameters in the examples above can be decision parameters at lower priorities, to thereby set four reserve strategies: if there are different failure levels of the two groups, then the group at the failure level will be reserved; and if there is the same failure level of the two groups, then the group where the master device is located before the stacking system is divided will be reserved, the group including the largest number of devices will be reserved, the group where the member device at the highest priority in the stacking system is located will be reserved, or the group where the member device with the preset device number is located will be reserved.

The values of the decision parameter collected by the two groups may be exactly the same in some reserve strategy under some condition. For examples, there is the same failure level of the two groups in the first example, the master device becomes offline so that the stacking system is divided in the second example, and there are the same number of devices in the two groups in the third example. At this time the group to be reserved may not be determined in the reserve strategy. Another condition in addition to the reserve strategy can be specified as a final judgment criterion to determine the group to be reserved, in this case, where a parameter to be applied in the final judgment criterion can be such that the values of the parameter for the two groups will be different. For example, the group to be reserved can be determined according to the active IDs of the groups.

In the block 320, the master device sends a division detection packet carrying the value of the decision parameter for the first group to member devices of the stacking system.

After the value of the decision parameter for the first group is collected, the master device encapsulates the value of the decision parameter in the division detection packet, and sends the division detection packet to the member devices of the stacking system. The division detection packet can be in an extended format of an existing protocol packet or can be in a customized format as long as it can be sent to and correctly parsed by the other member devices. In an example, a Link Aggregation Control Protocol (LACP) packet can be used as the division detection packet by carrying the value of the decision parameter in an extended Type-Length-Value (TLV) field thereof.

After the stacking system is divided, the master device of the two groups each will generate and send a division detection packet. The division detection packet is sent via data port rather than the stacking port, and if the second group is connected with the first group over the network, then the master device in the second group will receive the division detection packet; and if the two groups are located respectively in two networks disconnected from each other, then both of the two groups will be online, and can operate in their respective connectivity network ranges at the address and configuration of the stacking system without any confliction.

As described above, if the values of the decision parameter for the two groups may be exactly the same in some reserve strategy, then another condition can be specified as a final judgment criterion to determine the group to be reserved. In this case, a parameter of the group to be applied in the judgment criterion can also be sent to the second group in the division detection packet.

In the block 330, a division detection packet carrying a value of the decision parameter of a second group of said plurality of groups is received by the master device.

If the master device does not receive any division detection packet of the second group, then such two cases may occur that the stacking system is not divided (for example, the leaving member device has become offline) or the two opposite groups after the stacking system is divided are not connected over the network. In these two cases, the first group can operate normally as the stacking system, and no decision on maintaining one of the groups will be made.

It shall be noted that the block 330 and the block 340 may not be performed in a strict sequential order.

In the block 340, the master device determines which group of said plurality of groups is to be reserved as an active stacking system, wherein said determining is carried out in accordance with a reserve strategy, said reserve strategy being based on the value of the decision parameter of the first group and the value of the decision parameter of the second group.

Upon reception of the division detection packet sent by the master device of the groups, the master device parses it for the values of the decision parameter of the groups, applies the value of the decision parameter for the first group, and the value of the decision parameter for the group to the preset reserve strategy, and determines which one of the groups is to be reserved.

There may be different reserve strategies on the member devices while the stacking system is operating. For example, two stacking systems with different preset reserve strategies are integrated. In order to avoid the two groups from making different decisions by the two different reserve strategies, the reserve strategy of the first group, and the parameter to be applied in the final judgment criterion can be carried in the division detection packet and sent to the second group. Upon reception of the division detection packet of the second group, the master device firstly compares the reserve strategy of the first group with the reserve strategy of the second group for consistency, and if they are consistent, then the master device may continue to determine which one of the groups to be reserved according to the reserve strategy which is consistent for both the first and second groups. Otherwise, if the reserve strategies of the first group and second group are not consistent, the master device may determine which one of the groups is to be reserved, according to the parameter to be applied in the final judgment criterion.

In an example, the master device can send a decision result to the second group after determining which one of the groups is to be reserved. The decision result indicates which group is to be reserved. As only one group is reserved, the decision result effectively also indicates that the other group is to be disabled. The master devices in the two groups compare the decision results with their local decision results upon reception of the decision results of the groups, and if the decision results are consistent, then the master devices apply the decision results. For example the master device may maintain the first groups when being reserved or disable service ports of the groups when being not reserved. Otherwise, the master devices may determine which one of the groups to be reserved, according to the final judgment criterion.

It shall be noted that if the decision parameter includes a failure level, then it may take a long period of time to collect failure information of the distributed member devices, and at this time, generating the division detection packet or comparing the local failure level with the opposite failure level may be performed after the failure information states of the distributed devices settle, to thereby derive an accurate decision result.

Apparently in this example, the particular demand of the application environment where the stacking system is located is described in the reserve strategy in this example, and after the stacking system is divided, the values of the decision parameter of the two groups are acquired and notified to the groups, and the master devices in the two groups apply the values of the decision parameter of the groups respectively to the same reserve strategy to determine one of the groups to be reserved, so that the group more suitable for the demand of the application environment after the stacking system is divided can be reserved. Since the master devices in the two groups apply the same decision parameter to the same reserve strategy for the decision, the two groups will obtain the same decision result, that is, one of the groups is reserved, and the other group is disabled for the service.

Still taking the stacking system illustrated in FIG. 1 as an example, if the bandwidth and the processing capacity of the stacking system are the most crucial in the application scenario thereof. Since each member device is provided with substantially the same bandwidth and processing capacity, such a reserve strategy is preset on each member device that if there are two failure levels of the two groups, then the group at the lower failure level will be reserved; and if there is the same failure level of the two groups, then the group including the largest number of devices will be reserved. While the stacking system is operating, if the link connecting the stacking port 122 of the member device 120 with the stacking port 131 of the member device 130 is broken, then the member devices 110 and 120 will determine that the member devices 130, 140, and 150 have leaved, and the member devices 110 and 120 are a first group for which a new master device, i.e., the member device 110, is elected; and the member devices 130, 140, and 150 also determine that the member devices 110 and 120 have left, and the member devices 130, 140, and 150 are a second group for which still the member device 150 is the master device.

The master device 110 in the first group collects the failure level of and the number of devices in the first group, and if the failure level corresponding to the broken link is normal, then the master device will obtain the values of the decision parameters for the first group as the failure level which is normal, and the number of devices which is 2. The master device 110 encapsulates the two values of the decision parameters in the extended TLV field of the LACP packet, and sends them to the respective member devices in the original stacking system from the ports via which the network devices 161 and 162 are connected. Alike the master device 150 in the second group collects the failure level of and the number of devices in the first group, and if the failure level corresponding to the broken link is normal, then the values of the decision parameters for the second group will be the failure level which is normal, and the number of devices which is 3. The master device 150 encapsulates the two values of the decision parameters in the extended TLV field of the LACP packet, and sends them to the respective member devices in the original stacking system from the ports via which the network devices 161 and 162 are connected.

The master device 110 in the first group of device, and the master device 150 in the second group receive the LACP packets of the groups respectively, obtain the values of the decision parameters for the groups from the LACP packets, and apply the values of the decision parameters for the groups to the reserve strategies; and since there is the same failure level of the two groups, the group including the largest number of devices, i.e., the second group, will be reserved. The master device 110 in the first group of device disables the service port on the master device 110, and instructs the member device 120 thereof to disable the service ports. The second group becomes the new stacking system after the original stacking system is divided, and continues to provide the service, such as data forwarding.

Figure 4:
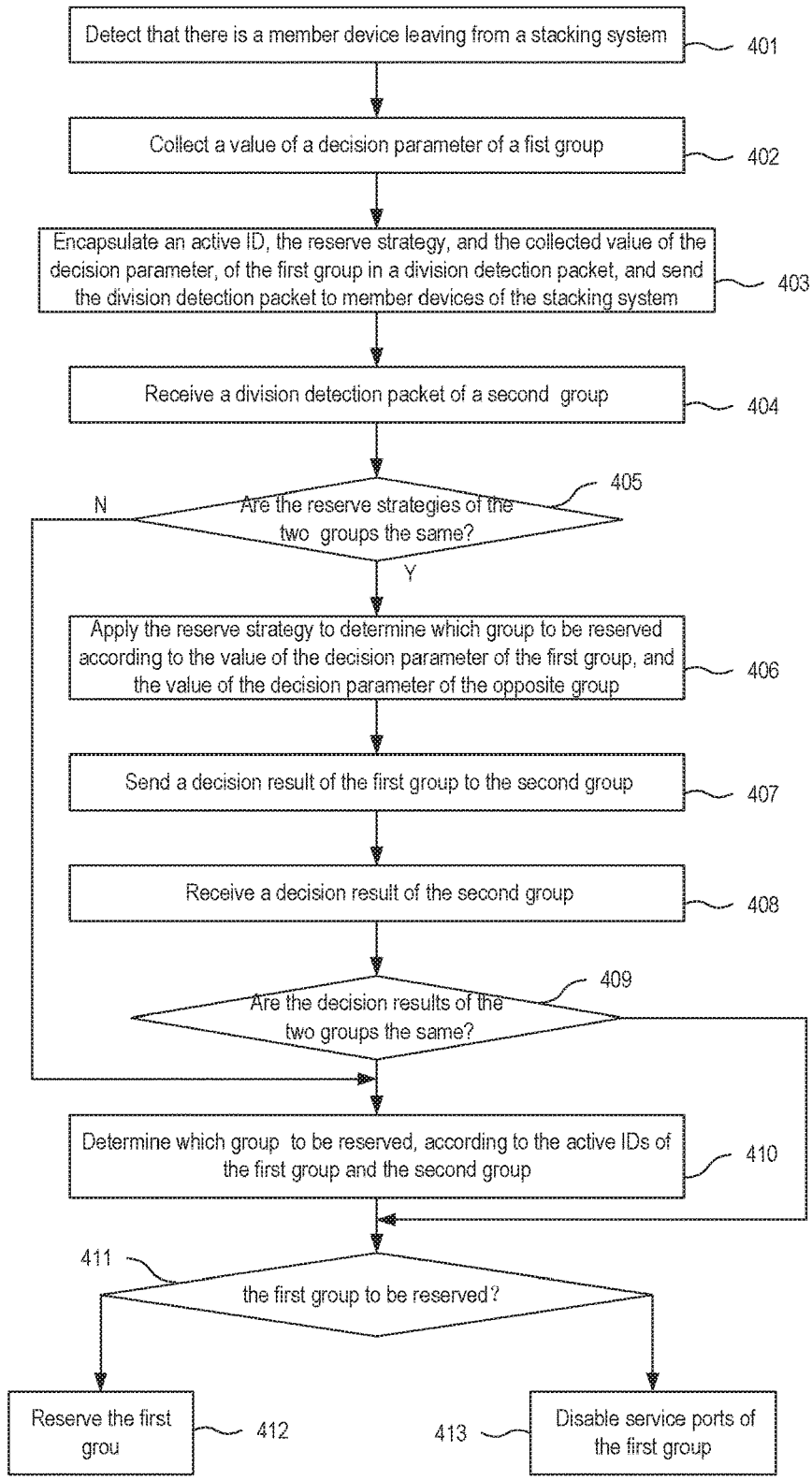
FIG. 4 is a flow chart of a method for handling a failure of a stacking system in another example.

In another example of this application, the master device carries the active ID of the first group in the division detection packet as the final judgment criterion to determine one of the groups to be reserved; and carries the reserve strategy of the first group to thereby avoid the reserve strategies to be applied by the two groups from being different from each other. FIG. 4 illustrates a flow in this example as follows:

The block 401 is to detect that there is a member device leaving from a stacking system.

In the block 402, a master device collects a value of a decision parameter of a first group in a preset reserve strategy.

The block 403 is to encapsulate an active ID, the reserve strategy, and the collected value of the decision parameter, of the first group in a division detection packet, and sends the division detection packet to member devices of the stacking system, where the reserve strategy can be the reserve strategy described in a prescribed format or can be represented as a predetermined number corresponding to the reserve strategy or can be represented as a code which can identify the reserve strategy to be applied, although this example will not be limited thereto.

The block 404 is to receive a division detection packet of an second group, which also carries an active ID of the second group, a reserve strategy, and a value of the decision parameter.

The block 405 is to judge whether the reserve strategy of the first group is the same as that of the second group, and if so, to proceed to the block 406; otherwise, to jump to the block 410.

The block 406 is to apply the reserve strategy according to the value of the decision parameter for the first group, and the value of the decision parameter for the second group to determine which group to be reserved.

The block 407 is to send a decision result of applying the reserve strategy to the first group to the second group.

The block 408 is to receive a decision result of applying the reserve strategy to the second group.

The block 409 is to judge whether the decision result of the first group is the same as the decision result of the second group, and if so, to jump to the block 411; otherwise, to proceed to the block 410.

The block 410 is to determine one of the groups to be reserved, according to the active IDs of the first group and the second group.

The block 411 is to judge whether the first group is the group to be reserved, and if so, to proceed to the block 412; otherwise, jump to the block 413.

The block 412 is to reserve the first group, and to proceed with a service of the original stacking system at an address and a configuration of the stacking system before the stacking system is divided, and the flow ends.

The block 413 is to disable the service ports of the first group, and the flow ends.

When a group is disabled (e.g. the first group in block 413 of the above example), the disabled group may be reconfigured by an administrator. After being reconfigured, the member devices of the disabled group may join the reserved group to enhance the capability of the stacking system.

It shall be noted that the block 403 and the block 404 may be performed in the order shown in the figure, or in a different order or at the same time. Likewise the block 407 and the block 408 may be performed in the order shown in the figure, or in a different order or at the same time.

In this example, the two groups notify the groups of the decision results of the first groups after obtaining the decision results by applying the reserve strategies respectively, and if the decision results of the two groups are consistent, then the two groups disable one of the groups according to the decision results; otherwise, the two groups decide according to the active IDs. The decision parameter of the first group may change while the two groups are exchanging the decision parameter and applying the reserve strategies, so the confirmation of the decision results can be added in this example to thereby prevent the decision results of the two groups from being inconsistent due to this so as to avoid both of the two groups from being reserved or disabled.

In correspondence to the flow above, this application further provides a device for handling a failure of a stacking system 5, which is applicable to a master device of the stacking system from which there is a member device leaving, where the device can be embodied in software or can be embodied in hardware or in a combination of software and hardware. For example, if the device is embodied in software, then the device can be logically embodied as the processor 211 in FIG. 2 reading the failure handling logic into the memory 212 and executing the failure handling logic.

Figure 5:
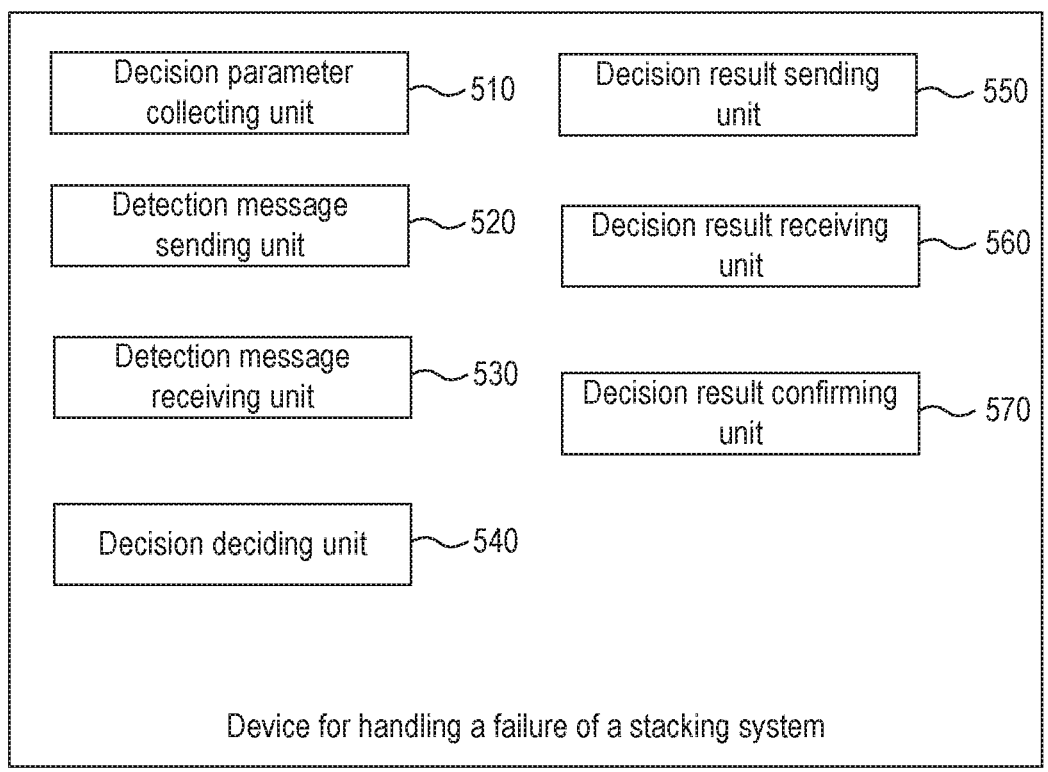
FIG. 5 is a logic structural diagram of a device for handling a failure of a stacking system in an example.

FIG. 5 illustrates a device for handling a failure of a stacking system, in an example of this application, which is applicable to a master device of the stacking system from which there is a member device leaving, where the device includes a decision parameter collecting unit 510, a detection packet sending unit 520, a detection packet receiving unit 530, and a division deciding unit 540, where the decision parameter collecting unit 510 is configured to collect a value of a decision parameter for a first group in a preset reserve strategy by which one of groups to be reserved when the stacking system is divided is determined according to the at least one decision parameter; the detection packet sending unit 520 is configured to send a division detection packet carrying the value of the decision parameter for the first group to member devices of the stacking system; the detection packet receiving unit 530 is configured to receive a division detection packet carrying a value of the decision parameter of an second group; and the division deciding unit 540 is configured to apply the reserve strategy according to the value of the decision parameter for the first group, and the value of the decision parameter for the second group to determine which group to be reserved.

The decision parameter can include a failure level; and the reserve strategy can be such that if there are different failure levels of the two groups, then the group at the lower failure level is reserved.

If the failure level is the decision parameter, then the decision parameter collecting unit 510 can be configured to set the failure level high if the first group fails in hardware or in software; or to otherwise set the failure level normal.

The reserve strategy can be further such that if there is the same failure level of the two groups, then the group where a master device of the stacking system before there is a member device leaving is located is reserved, the group including the largest number of devices is reserved, the group where the member device at the highest priority in the stacking system is located is reserved, or the group of device including a member device with a preset device number is reserved.

In an example, the division detection packet further carries an active ID of the group; and the device further includes a decision result sending unit 550, a decision result receiving unit 560, and a decision result confirming unit 570, where the decision result sending unit is configured to send a decision result of applying the reserve strategy to the first group to the second group; the decision result receiving unit is configured to receive a decision result of applying the reserve strategy to the second group; and the decision result confirming unit is configured to maintain the first group or disable the first group of device according to the decision result if the decision results of the two groups are consistent; otherwise, to determine which group to be reserved, according to the active IDs.

The division detection packet can further carry an active ID and the reserve strategy of the group; and at this time the division deciding unit 540 is configured to compare the reserve strategy of the first group with the reserve strategy of the second group, and if they are the same, to apply the reserve strategy to determine the group to be reserved; otherwise, to determine the group to be reserved, according to the active IDs.

The division detection packet can be an LACP packet.

In another example, referring to FIG. 2, a non-transitory computer readable storage medium with instructions 213 is provided. The non-transitory computer readable storage medium stores failure handling logic including machine readable instructions which are executable by a processor to implement the method of FIG. 3 or FIG. 4.

The foregoing disclosure is merely illustrative of examples of the disclosure but not intended to limit the disclosure, and any modifications, equivalent substitutions, adaptations, thereof made without departing from the spirit and scope of the disclosure shall be encompassed in the claimed scope of the appended claims.

The invention claimed is:

1. A method for handling a failure in a stacking system, comprising:
    after the stacking system has divided into a plurality of groups, wherein each group comprises at least one member device,
    a master device of a first group of said plurality of groups collecting a value of a decision parameter for the first group sending, by the master device,
    a division detection packet carrying the value of the decision parameter for the first group to member devices of the stacking system;
    receiving, by the master device, a division detection packet carrying a value of the decision parameter of a second group of said plurality of groups; and
    determining, by the master device, which group of said plurality of groups is to be reserved as an active stacking system,
    wherein said determining is carried out in accordance with a reserve strategy,
    said reserve strategy being based on the value of the decision parameter of the first group and the value of the decision parameter of the second group;
    wherein the division detection packet carrying the value of the decision parameter for the first group further carries an active ID of the first group and the division detection packet carrying the value of the decision parameter for the second group further carries an active ID of the second group; the method further comprising:
    sending a decision result of the first group to the second group, the decision result indicating which group is to be disabled;
    receiving a decision result of the second group, the decision result indicating which group is to be disabled; and
    reserving or disabling the first group according to the decision result if the decision results of the first group and second group are consistent; and
    if the decision results are not consistent, determining which group is to be reserved based on the active IDs of the first and second groups.

2. The method according to claim 1, wherein the decision parameter comprises a failure level; and the reserve strategy comprises: if the first group and second group have different failure levels, reserving the group which has the lower failure level.

3. The method according to claim 2, wherein collecting the value of the decision parameter for the first group comprises: setting the failure level at a relatively higher level if the first group fails in hardware or in software; and otherwise, setting the failure level at a relatively lower level.

4. The method according to claim 1, wherein the reserve strategy further comprises: if the first group and the second group have the same failure level, then reserving the group which comprises a master device of the stacking system, or reserving a group comprising a largest number of member devices, or reserving a group comprising a member device which has a highest priority in the stacking system, or reserving a group of devices comprising a member device with a preset device number.

5. The method according to claim 1, wherein the division detection packet carrying the value of the decision parameter for the first group further carries an active ID of the first group and the division detection packet carrying the value of the decision parameter for the second group further carries an active ID of the second group; and wherein the method further comprises:

comparing the reserve strategy of the first group with the reserve strategy of the second group, and if the reserve strategies are the same, then applying the reserve strategy; and if the reserve strategies are not the same, determining the group to be reserved, according to the active IDs of the first group and the second group.

6. The method according to claim 1, wherein the division detection packet is a Link Aggregation Control Protocol (LACP) packet.

7. A device for handling a failure in a stacking system, the device comprising:

a decision parameter collecting unit, to collect a value of a decision parameter for a first group to which the device belongs, after the stacking system has split into a plurality of groups;

a detection packet sending unit, to send a division detection packet carrying the value of the decision parameter for the first group to member devices of the stacking system;

a detection packet receiving unit, to receive a division detection packet carrying a value of the decision parameter of a second group of said plurality of groups; and a division deciding unit, to apply a reserve strategy to determine which group of the plurality of groups is to be reserved as an active stacking system, the reserve strategy being based on the value of the decision parameter of the first group and the value of the decision parameter of the second group;

wherein the division detection packet carrying the value of the decision parameter for the first group further carries an active ID of the first group and the division detection packet carrying the value of the decision parameter for the second group further carries an active ID of the second group; the method further comprising:

sending a decision result of the first group to the second group, the decision result indicating which group is to be disabled;

receiving a decision result of the second group, the decision result indicating which group is to be disabled; and reserving or disabling the first group according to the decision result if the decision results of the first group and second group are consistent; and if the decision results are not consistent, determining which group is to be reserved based on the active IDs of the first and second groups.

8. The device according to claim 7, wherein the decision parameter comprises a failure level; and the reserve strategy comprises: if there are different failure levels of the first group and the second group, reserving the group which has the lower failure level.

9. The device according to claim 8, wherein the decision parameter collecting unit is configured to set the failure level at a relatively higher level if the first group fails in hardware or in software; and otherwise set the failure at a relatively lower level.

10. The device according to claim 7, wherein the reserve strategy further takes into account at least one of the following: which group includes the device which was the master device of the stacking system before the stacking system split, the relative number of member devices in the groups, which group comprises the member device which has the highest priority in the stacking system, and which group includes a member device having a preset device number.

11. The device according to claim 8 wherein the reserve strategy further comprises: if the first group and the second group have the same failure level, then reserving the group having which comprises a device which was the master device of the stacking system before the stacking system split, or reserving a group comprising a largest number of member devices, or reserving the a group comprising the a member device which has a highest priority in the stacking system, or reserving a group of devices comprising a member device with a specified preset device number.

12. The device according to claim 7, wherein each division detection packet carries a detection parameter of a group which it relates to and an active ID of the group which it relates to; the device further comprising:

a decision result sending unit, to send a decision result of the first group to the second group, wherein the decision result indicates which group is to be reserved in accordance with the reserve strategy applied by the first group;

a decision result receiving unit, to receive a decision result of the second group; and a decision result confirming unit, to maintain the first group or disable the first group in accordance with the decision result if the decision results of the first and second groups are consistent; and to determine which group is to be reserved, according to the active IDs of the first and second groups.

13. The device according to claim 7, wherein the division detection packet further carries an active ID and the reserve strategy of the group; and the division deciding unit is to compare the reserve strategy of the first group with the reserve strategy of the second group, and if the reserve strategies are the same, then apply the reserve strategy; otherwise, determining the group to be maintained, according to the active IDs.

14. A non-transitory computer readable storage medium storing machine readable instructions which are executable by a processor to:

detect that a stacking system has split into a plurality of groups, wherein each group comprises at least one member device in response to detecting that the stacking system has split, collect by a master device of a first group of said plurality of groups a decision parameter for the first group;

send by the master device, a division detection packet carrying the value of the decision parameter for the first group to member devices of the plurality of groups;

receive, by the master device, a division detection packet carrying a value of the decision parameter of a second group of said plurality of groups; and determine, by the master device, which group of said plurality of groups is to be reserved as an active stacking system, wherein said determining is carried out in accordance with a reserve strategy, said reserve strategy being based on the value of the decision parameter of the first group and the value of the decision parameter of the second group;

wherein the division detection packet carrying the value of the decision parameter for the first group further carries an active ID of the first group and the division detection packet carrying the value of the decision parameter for the second group further carries an active ID of the second group; the method further comprising:

sending a decision result of the first group to the second group, the decision result indicating which group is to be disabled;

receiving a decision result of the second group, the decision result indicating which group is to be disabled; and reserving or disabling the first group according to the decision result if the decision results of the first group and second group are consistent; and if the decision results are not consistent, determining which group is to be reserved based on the active IDs of the first and second groups.

* * * * *